United States Patent [19]

Gecewicz et al.

[11] 4,141,038
[45] Feb. 20, 1979

[54] APPARATUS AND METHOD FOR QUANTIFYING IRREGULARITIES IN INTERFERENCE PATTERNS

[75] Inventors: Ronald L. Gecewicz; George C. Hunter, both of Middletown, Conn.

[73] Assignee: Zygo Corporation, Middlefield, Conn.

[21] Appl. No.: 768,342

[22] Filed: Feb. 14, 1977

[51] Int. Cl.² .............................................. H04N 7/02
[52] U.S. Cl. .................................... 358/107; 356/345; 358/139
[58] Field of Search ................ 358/107, 139; 356/109, 356/110, 167, 168, 171, 106 R; 325/67, 133, 134, 363

[56] References Cited

U.S. PATENT DOCUMENTS

| | | | |
|---|---|---|---|
| 3,199,400 | 8/1965 | Zabinski | 356/106 R |
| 3,644,046 | 2/1972 | Ryan | 356/106 R |
| 3,678,192 | 7/1972 | Akuta et al. | 358/107 |
| 3,967,054 | 6/1976 | Walton | 358/107 |
| 3,967,903 | 7/1976 | Enami et al. | 356/167 |

*Primary Examiner*—Robert L. Griffin
*Assistant Examiner*—Joseph A. Orsino, Jr.
*Attorney, Agent, or Firm*—Milton Zucker

[57] ABSTRACT

Apparatus and methods are herein disclosed for use in conjuction with a standard monochrome closed-circuit television system for the generation, display, and manipulation of geometrical patterns upon the screen of the video monitor for the purpose of quantifying the irregularities in an interference pattern displayed on the screen of the video monitor. The invention comprises, in one embodiment, a control unit connected between the television camera and the video monitor of a standard closed circuit television system. The control unit includes the control means, switches, and electronic circuitry for the generation, manipulation, and control of video signals which are superposed onto the video signals from the camera and which are to be displayed on the screen of the video monitor. By manipulating the geometrical pattern generated by the control unit to conform to that of the interference fringe pattern transduced by the television camera, the errors which are manifest as irregularities in the interference fringe pattern can be measured.

8 Claims, 10 Drawing Figures

APPARATUS AND METHOD FOR QUANTIFYING IRREGULARITIES IN INTERFERENCE PATTERNS

BACKGROUND OF THE INVENTION

1. Field of the Invention

THe present invention relates to apparatus and methods for quantifying the irregularities in interference fringe patterns commonly encountered in optical metrology. More particularly, the invention relates to apparatus for use in conjunction with a standard monochrome closed-circuit television system for the generation, display, and manipulation of geometrical patterns upon the screen of the video monitor for the purpose of quantifying the irregularities in an interference pattern displayed on the screen of the video monitor.

2. The Prior Art

Interferometric testing has long been used in optical metrology. The advent of the laser has not only made interferometers more convenient to use but has also extended their range of application. Interferometry is used as a tool in the fabrication, final testing, and system slignment, see for example, C. Zanoni, "Interferometry," The *Optical Industry and Systems Directory Encyclopedia*, v. 2, E137 (1977).

For most interferometry the output of the test is either an interference fringe pattern or an interferogram. The type of pattern is usually determined by the particular measurement configuration even though in some instances the errors in the article under test can dictate the type of pattern. Nevertheless, the quantitative reduction of an interference fringe pattern is usually based on ascertaining the fractional departure of the interference fringe pattern from some ideal, best-fitting pattern. The denominator of the fractional departure is usually the average spacing between a pair of fringes in the ideal pattern.

The quantitative usefulness of an interference pattern is dependent upon having a method of data extraction and reduction. Interference pattern reduction can range in complexity from a simple visual evaluation to an elaborate reduction of the data extracted by an automatic microdensitometer with a large computer, see, for example, R. A. Jones and P. L. Kadakia, "An Automated Interferogram Technique," Appl. Opt. 7, 1477 (1968). In between these extremes there are a great variety of means for hand reduction, see, for example, R. Berggren, "Analysis of Interferograms," *Optical Spectra*, December, 1970, p. 22.

A common technique for reducing interferograms by hand uses a device comprised of a hinged parallelogram with a number of equally spaced, hinged members to produce a grid of parallel, equally spaced straight lines of variable spacing. While this technique is useful for a casual evaluation, it is time consuming and tedious to extract quantitative results.

The reduction of interferograms by hand is further complicated when there is a power or a focus error which produces a curvature in the fringes. The bull's-eye pattern with non-uniformly spaced concentric circles is a familiar example. Hand reduction of these complex fringe patterns is extremely tedious and time consuming.

Sophisticated, expensive interferometers have been designed and built for high precision, automatic reduction of interferograms, e.g., one such instrument is disclosed in Gallager et al., U.S. Pat. No. 3,694,088, Sept. 26, 1972. Another sophisticated digital interferometer is discussed in J. H. Bruning, et al., "Digital Wavefront Measuring Interferometer for Testing Optical Surfaces and Lenses," Appl. Opt. 13, 2693 (1974).

In many industrial applications, it is desirable to reduce interferograms quickly in a simple, economic manner. For example, in the manufacture of high precision, high volume optical components, interferograms and interferometer interference patterns must be measured in large numbers and at high speed with affordable instrumentation.

While the prior art methods are useful for some applications, they cannot be used in many industrial applications similar to the one mentioned above.

OBJECT OF THE INVENTION

It is the principal object of this invention to provide an improved apparatus and method for quantifying irregularities in interference patterns.

STATEMENT OF THE INVENTION

In accordance with the instant invention, we quantify the irregularities in a geometric test pattern such as an interference fringe pattern by providing means to display the test pattern on a television viewing screen, other means to generate and display on the same viewing screen a measuring pattern which can be conformed to the test pattern, still other means for moving the measuring pattern and the test pattern relative to each other from a position in which the measuring pattern is entirely on one side of the test pattern while it passes at one or more points through the center of the fringe in the portion of the test pattern which is offset furthest to that side, and then either moving the measuring pattern, or generating a second measuring pattern which is positioned on the other side of the test pattern in the same manner, and means for measuring the distance between the two positions of the measuring pattern(s) and for comparing this distance with the average distance between the line of the measuring pattern, thus quantifying the peak-to-valley irregularity in the test pattern. Where two measuring patterns are used, they are preferably of opposite color, i.e., one is white and the other is black.

THE DRAWINGS

In the drawings,

FIG. 1 illustrates an embodiment of the invention with a single generated pattern used to reduce the interference pattern from an interferometer.

DETAILED DESCRIPTION OF THE INVENTION

Figure 1:
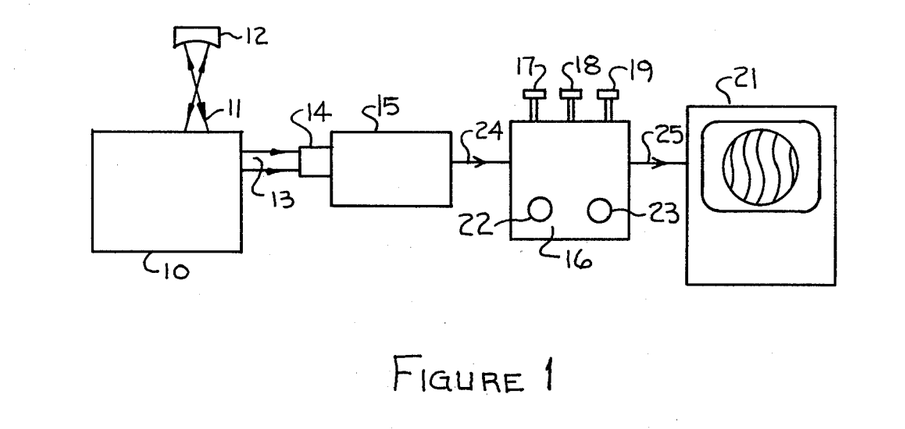
FIG. 1 is a pictorial view illustrating the principal components of an embodiment of the invention including a closed circuit television camera, video monitor, and a control unit.

DESCRIPTION AND EXPLANATION OF FIG. 1

Figure 2:
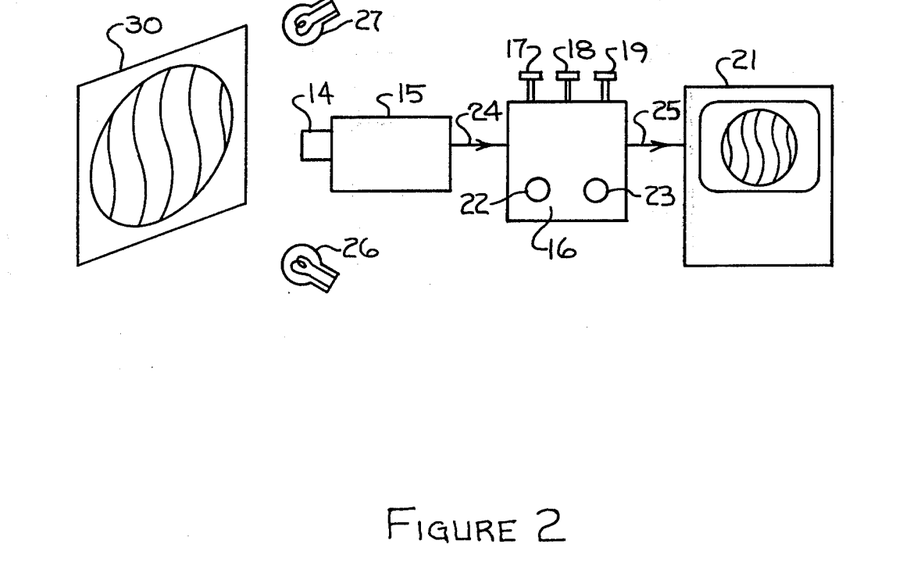
FIG. 2 is a pictorial view illustrating an embodiment of the invention used to reduce a photograph of an interference pattern.
Figure 3:
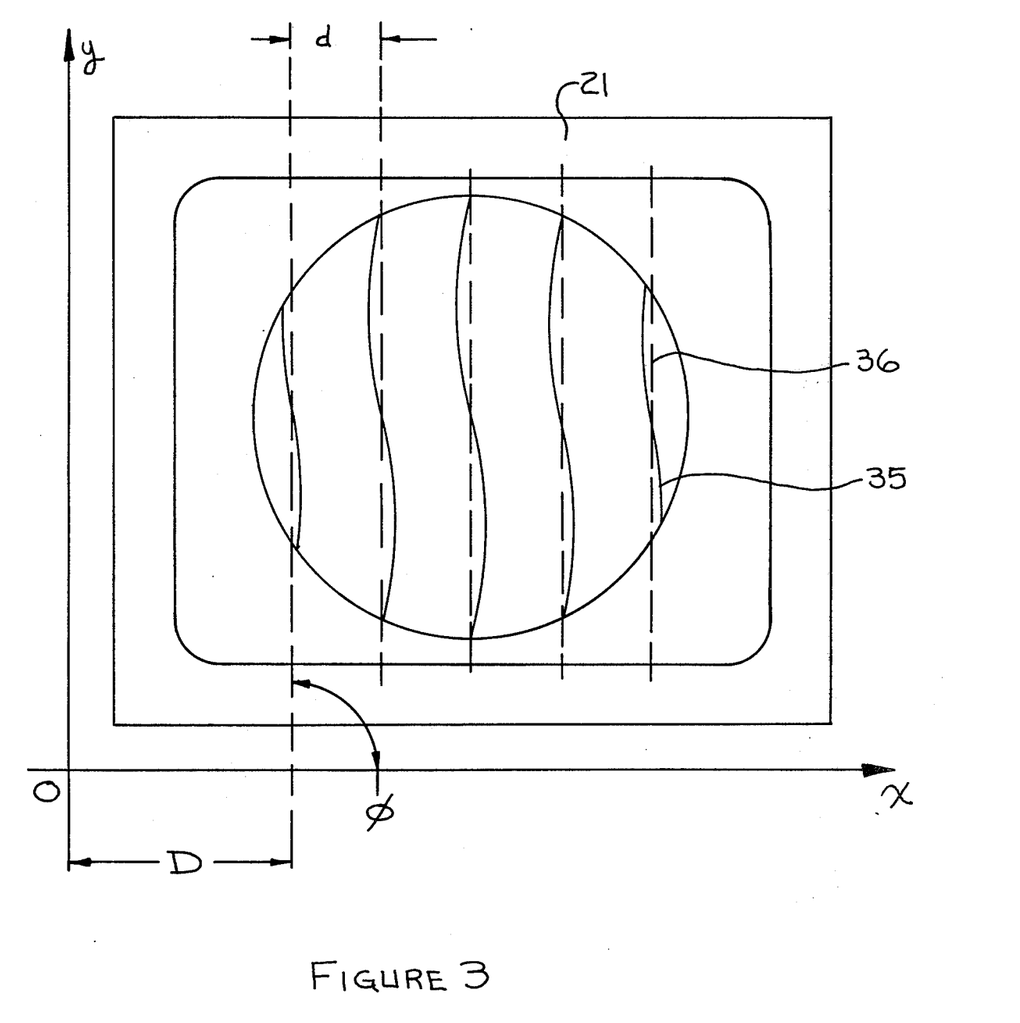
FIG. 3 is a pictorial view illustrating the images on the screen of the closed circuit video monitor.

The principal components of the embodiment of the invention are illustrated in FIG. 1. In FIG. 1 the measurement beam (11) of the interferometer (10) impinges on the article under test (12). The output of the interferometer (10) is a beam of light (13) which provides the interference fringe pattern. This interference fringe pattern contains information about the test parameters as well as the article under test. The interference pattern on light beam (13) can be processed in a variety of ways. For exmple, it can be viewed by inserting a ground-glass screen into the beam (13). If a permanent record of the interference pattern is desired, a photograph can be made of the light beam (13). Alternatively the light beam (13) can be imaged by a lens (14) onto the photosensitive imaging device of a closed circuit television camera (15) whose video output (24) can be connected with coaxial cable to a closed circuit video monitor (21). In this way, the interference fringe pattern appears on the screen of the video monitor (21). The fringe patterns are depicted in FIGS. 1, 2, and 3 as solid curved lines. However, as is well known, interference fringes are actually comprised of bright and dark bands, and the solid lines on the figures represent the loci of the fringe centers. The closed circuit television camera (15) and the video monitor (21) can be any of the standard commercially available monochrome models in general use. THe only technical requirement is a tolerance on the permissible geometrical distortion in the lens (14), the camera (15), and the monitor (21) based on the system accuracy desired.

In the present invention, a control unit (16) receives the video output (24) of the camera (15) and provides the input (25) to the video monitor (21). The control unit (16) generates a pattern which appears on the video monitor superposed on the interference fringe pattern. The control unit (16) has control knobs (17), (18), and (19) with which an operator can manipulate the key parameters of the pattern generated by the control unit and visible on the screen of the monitor (21).

Figure 6:
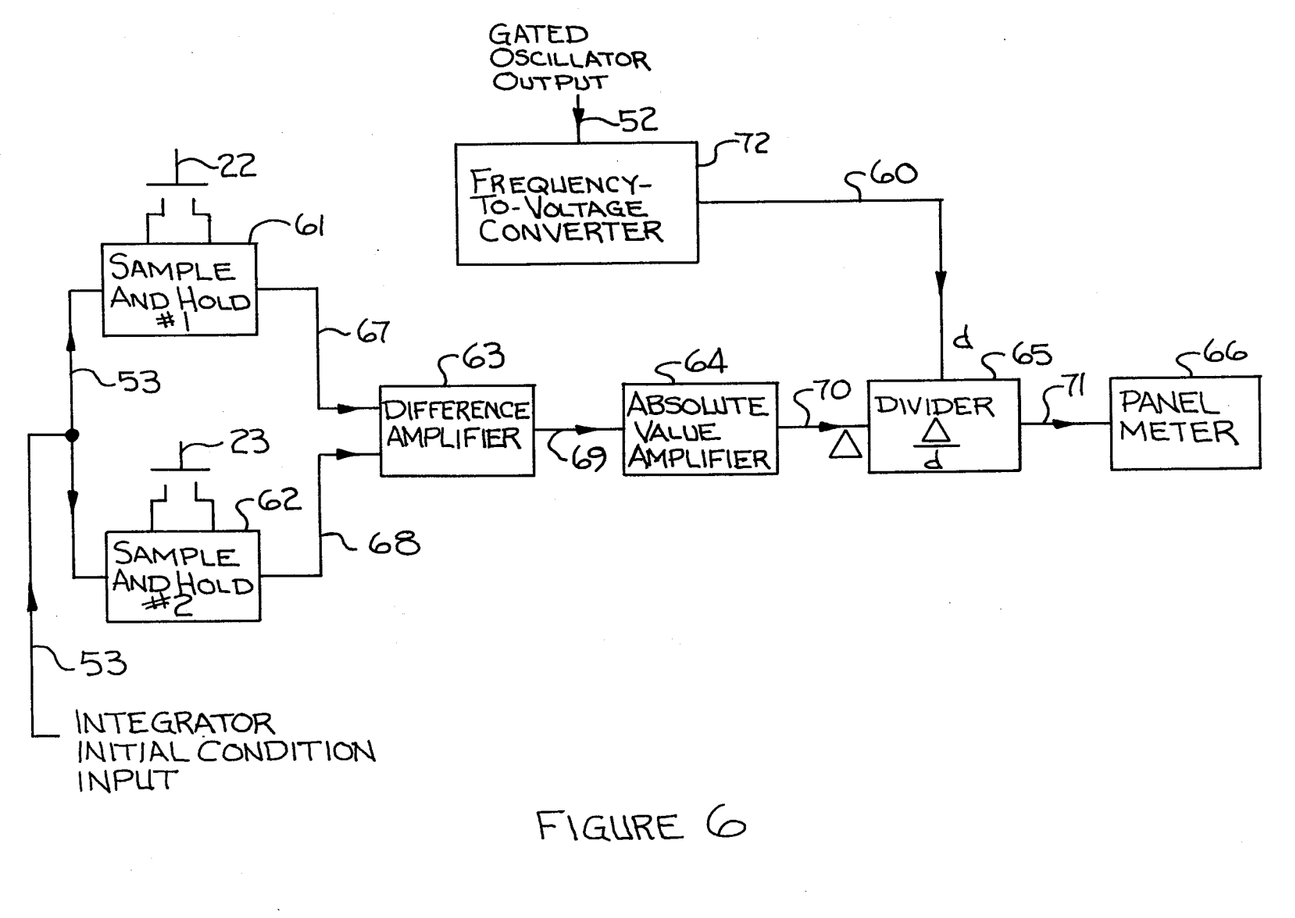
FIG. 6 is a block diagram of the preferred means of quantitatively reducing an interference pattern with a single pattern generated by the control unit.

The functions of buttons (22) and (23) are described in the description of FIGS. 3 and 6.

DESCRIPTION AND EXPLANATION OF FIG. 2

FIG. 2 illustrates use of the present invention with a photograph of an interference pattern. The interferogram (30) is a photograph of an interference fringe pattern. Light sources (26) and (27) provide radiant energy to illuminate the interferogram (30). Lens (14) images (30) onto the photosensitive surface of camera (15). The remainder of the apparatus functions in accordance with the description provided for FIG. 1.

DESCRIPTION AND EXPLANATION OF FIG. 3

FIG. 3 is a pictorial view illustrating the images on the screen of the video monitor (2). Superposed on the image of the interference fringe pattern (35) is the pattern (36) which is generated by the control unit (16). The Cartesian coordinate axes provide a reference for the geometrical parameters of the patterns. The interference pattern (35) shown in FIG. 3 results from the interference of two tilted, nearly plane wavefronts. This particular pattern is used for the purpose of illustration, but it should be noted that the present invention is not limited to this type of pattern.

The pattern (36) is a family of parallel, equally spaced straight lines. Three parameters completely specify this pattern, namely: (1) the line spacing d, (2) the angular orientation $\phi$, and 3) the offset D. The control knobs (17), (18), and (19) in FIGS. 1 and 2 are the means by which the operator can vary independently each of the three parameters of the pattern generated by the control unit (16). For the case illustrated in FIG. 3, the operator firstly manipulates the knobs (17), (18), and (19) until the pattern (36) optimally (ideally in a leastsquares sense) fits the pattern (35).

In order to quantify the irregularities in the pattern (35), the operator manipulates the offset parameter, D, control knob (19) until the lines of the pattern (36) lie to one side, say to the left, of the corresponding lines of the fringe center pattern (35), while at least one of the lines of the pattern (36) is still in contact with its corresponding line in pattern (35) operator then depresses button (22) to cause the control unit to store the offset value for this position. THe operator now manipulates the offset parameter, D, control knob to displace the pattern (36) until the lines of the pattern (36) lie to the other side, say to the right, of the corresponding lines of the fringe center pattern (35), while at least one of the lines of the pattern (36) is still in contact with its corresponding line in pattern (35). The operator now depresses button (23) to cause the displacement in the pattern (36) to be measured and to be divided by the spacing d to yield an output yielding the peak-to-valley irregularity in the interference fringe pattern (35) in fractions of a fringe spacing.

Figure 4:
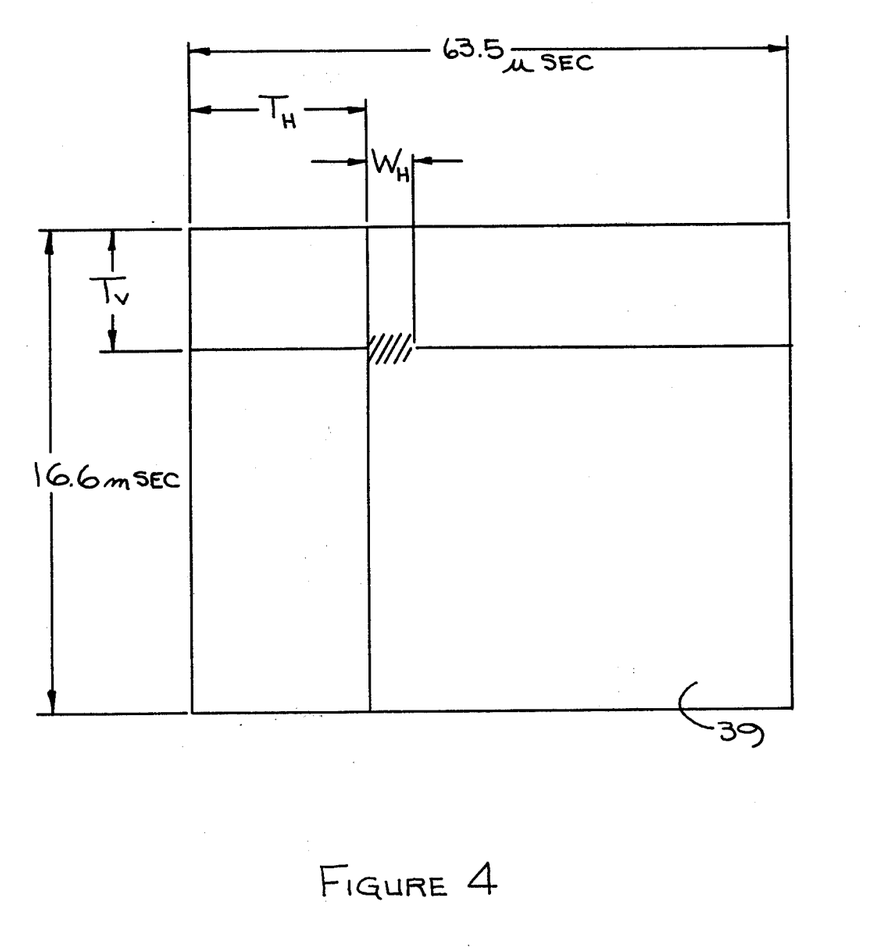
FIG. 4 is a sketch illustrating the manner in which patterns are formed on the screen of the video monitor.

DESCRIPTION AND EXPLANATION OF FIG. 4

FIG. 4 is a sketch illustrating the manner in which patterns are formed on the screen of the video monitor. The basic theory of pattern generation in a CCTV system as described herein is now set forth.

Referring to FIG. 4, at time zero the video monitor electron beam is at the upper left of screen (39). It starts moving quickly to the right and slowly downwards. 63.5 microseconds later a 5 microsecond sync pulse causes the beam to fly back rapidly to the left of the screen. The beam then moves to the right for 63.5 microseconds until the next horizontal sync pulse causes the next flyback to the left. After about 250 such horizontal scans (lines) the beam has progressed to the bottom of the screen and has produced a frame. A vertical sync pulse causes a rapid (one millisecond) vertical flyback to the top of the screen, and another frame-producing cycle starts. The total time per frame is 16.6 milliseconds.

In FIG. 4, assume that the major portion of the screen is dark, i.e., beam blanked, except for the cross hatched segment of the horizontal line shown. A visual mark is made by passing a (positive) unblanking video signal to the video monitor when, and only when, the beam is passing over the cross hatched segment.

The video (unblanking) signals required for the mark generator are described with the aid of FIG. 4. To produce the mark, assume that a pulse of width $W_H$ is generated $T_H$ microseconds after the occurrence of each horizontal sync pulse. Define these new pulses as $P_H$, i.e., horizontal video pulse. If the $P_H$ pulses were used as unblanking in the video monitor, the image on the screen of the video monitor would brighten whenever it had moved a distance equivalent to $T_H$ from the left side of the screen. It would stay bright for a length equivalent to $W_H$ and then darken. This would happen all during the vertical scan and 250 bright, short line segments of width $W_H$ would appear to the eye as a vertical line.

Now if instead of applying a single horizontal pulse $P_H$ per horizontal scan line, N uniformly spaced horizontal pulses $P_H$ per horizontal scan line are applied to the monitor's video input, a pattern of N equally spaced, vertical lines of width $W_H$ would appear to the eye on the screen of the video monitor.

By varying the time interval between the horizontal pulses $P_H$ per horizontal scan line for all horizontal scan lines, the spacing between the line pattern on the video monitor screen can be varied. By uniformly varying the time interval between the horizontal sync pulse and the start of the $P_H$ pulse stream for each horizontal scan, the offset, or location, of the line pattern on the video monitor screen can be varied independently of the spacing. If, in addition, the time interval between the horizontal sync pulse and the start of the $P_H$ pulse stream is varied for each horizontal scan, the angular orientation of the line pattern on the screen of the video monitor can be varied.

Figure 5:
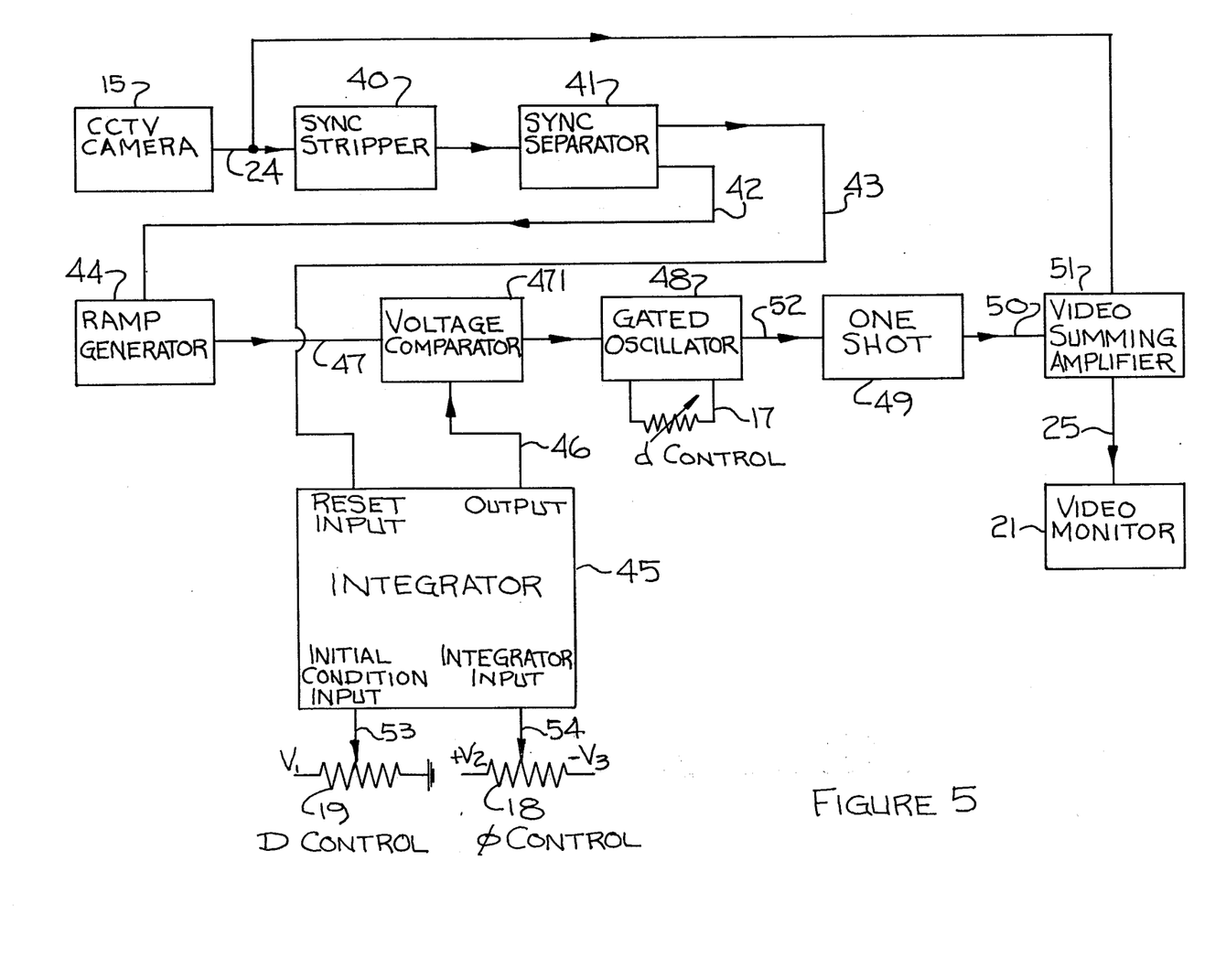
FIG. 5 is a block diagram of the means of generating and manipulating a single pattern generated by the control unit on the screen of the video monitor.

DESCRIPTION AND EXPLANATION OF FIG. 5

FIG. 5 is a block diagram of the means of generating and manipulating a single pattern generated by the control unit and viewed on the screen of the video monitor.

Referring to FIG. 5, the line and frame sync pulses are separated from the CCTV camera output (24) via the sync stripper (40) and are then separated from each other via the sync separator (41). The line sync pulses (42) are used to start and synchronize a ramp generator (44), and the frame sync pulses (43) are used to reset and start an integrator (45) every frame. The offset control (19) is the initial condition input (53) ($V_{offset}$) to the integrator (45), and the angular orientation control (18) is the input (54) ($V_{in}$) which is integrated. Thus the output (46) ($V_{out}$) of the integrator (45) as a function of time is $$V_{out} = V_{offset} + \int_0^t V_{in} dt'.$$

The sequence of dots on a line, or lines on a frame, is generated as follows. The ramp generator (44) starts at the beginning of a line. When the output (47) of the ramp generator (44) is larger than the output (46) of the integrator (45) the comparator (471) switches state and starts a gated oscillator (48). For every cycle of the oscillator a one-shot (49) is triggered. The output (50) of the one-shot (49) is then summed with the video signal (24) in the video summing amplifier (51). This causes the video signal (25) to be blanked i.e., to produce a black spot (or enhanced i.e., to produce a white spot if one wishes) at every point in time where the one-shot is triggered. Thus a series of dots black or white on a line, or black or white lines on a frame, are generated on the video monitor (21). If at the input to the integrator (45) $V_{in} = 0$, then $V_{out} = V_{offset}$ and the dots will be in the same position on each line, and the pattern formed will be a family of equally spaced vertical lines. The start of offset D of the lines is controlled by the offset control (19) which controls the $V_{offset}$ input (53) to the integrator (45). If $V_{offset}$ (53) is increased it will take longer for the ramp generator to reach the value and the series of dots (or lines) will be moved to the right. Lowering $V_{offset}$ has the opposite effect. If now the $V_{in}$ or angular orientation $\phi$ input (54) is made different from zero, the output of the integrator (45) will be linearly modulated up or down from $V_{offset}$, depending on the polarity of $V_{in}$, in phase with each frame generation. This causes the series of dots to start at a different time each line. Thus the video monitor (21) will show a family of tilted lines with an angular orientation $\phi$.

The spacing d of the lines is controlled by the line spacing control (17) which changes the frequency of the gated oscillator (48). A higher frequency causes more dots on each line.

DESCRIPTION AND EXPLANATION OF FIG. 6

FIG. 6 is a block diagram of the preferred means of quantitatively reducing an interference pattern with a single pattern generated by the control unit. As explained in the description of FIG. 2, the two offset positions of the grid pattern on either side of the interference pattern are stored in sample-and-hold #1 (61) via the operation of pushbutton (22) and sample-and-hold #2 (62) via operation of pushbutton (23). The outputs of the two sample-and-hold units (67) and (68) go to a difference amplifier (63), and the output (69) of the difference amplifier (63) goes to an absolution value amplifier (64). Its output (70) is then used as the numerator input to an analog divider (65). The denominator input (60) is obtained by putting the output (52) of the gated oscillator (48) into a frequency-to-voltage converter (72). The output (71) of the divider (65) is now the fractional departure of the interference pattern from the spacing d of the grid pattern on the monitor. This output (71) can be displayed on a digital or analog panel meter (66).

Figure 7:
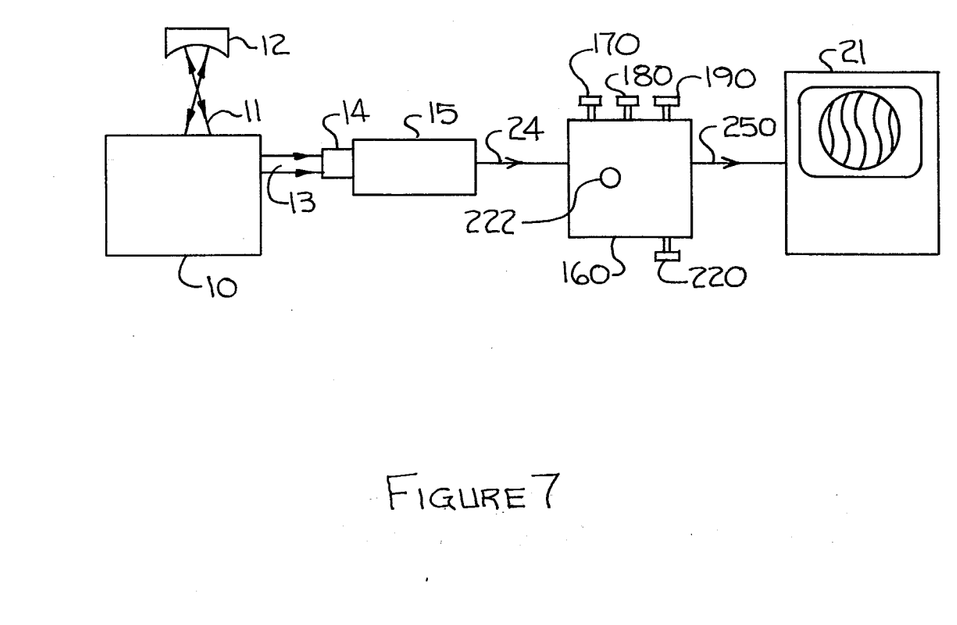
FIG. 7 illustrates an embodiment of the invention with two generated patterns used to reduce the interference pattern from an interferometer.
Figure 8:
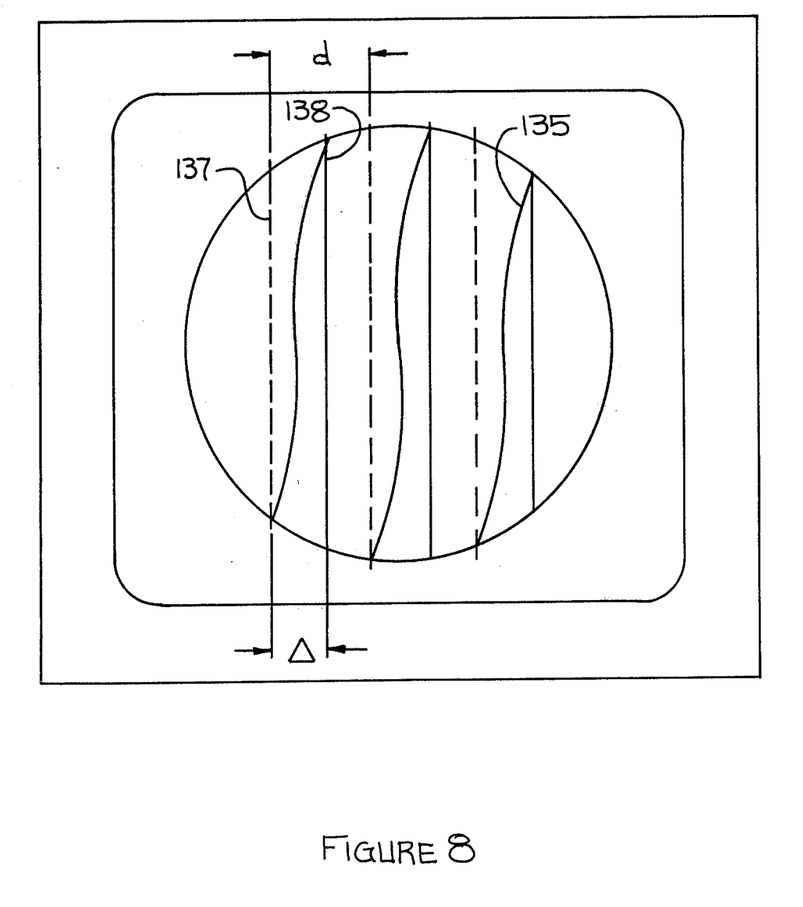
FIG. 8 is a sketch illustrating the manner in which two measuring patterns generated by the control unit are used on the screen of the video monitor.

DESCRIPTION AND EXPLANATION OF FIGS. 7 AND 8

FIG. 7 illustrates an embodiment of the invention with two generated patterns used to reduce the interference pattern for an interferometer.

FIG. 8 is a sketch illustrating the manner in which two measuring patterns generated by the control unit are used on the screen of the video monitor.

In FIG. 7, the reference characters describe the same components as in FIG. 1, except for the control unit, identified as (160) in FIG. 8. The control unit (160) has knobs (170), (180), and (190) with functions identical with the knobs (17), (18), and (19) of FIG. 1, in generating the measurement patterns to produce the output (250) fed to the monitor (21). The function of controls (220) and (222) will be hereinafter described.

In FIG. 8, the dashed measuring pattern (137) lies to the left of, but in contact with, the center of a fringe of the test pattern (135), and a second measuring pattern (138) lies to the right of, but in contact with, the center of a fringe of the test pattern (135). Δ designates the displacement between the two measuring patterns.

With control (220) in the "off" position, the operator manipulates the offset parameter, D, control knob (190) until the single pattern (137) lies entirely to one side, say to the left of, but is still in contact with the center of a fringe of pattern (135). The operator now manipulates the control knob (220) to the "on" position to generate a second pattern (138) which can be displaced until it lies entirely to the other side of, say to the right, but is still in contact with pattern (135). The first pattern is unaffected by the generation and manipulation of the second pattern. Furthermore, the two patterns are preferably of opposite color, i.e., one should be white and one black. The operator now depresses button (222) in FIG. 7 to cause the displacement, Δ, in the second pattern relative to the first pattern to be measured and to be divided by the spacing d to yield an output yielding the peak-to-valley irregularity in the interference fringe pattern (135) in fractions of a fringe spacing.

Figure 9:
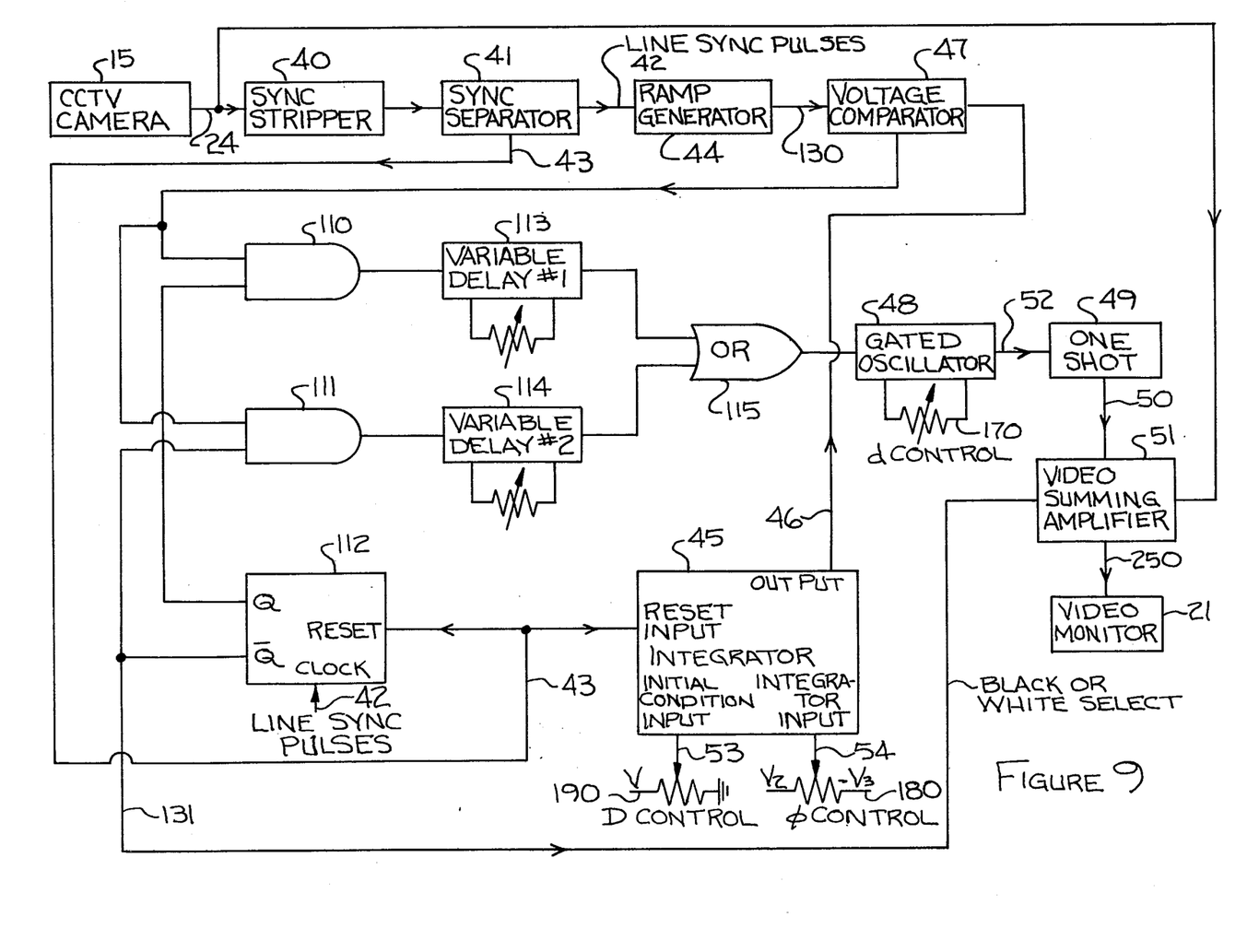
FIG. 9 is a block diagram of the preferred means of generating and manipulating two patterns generated by the control unit on the screen of the video monitor.

DESCRIPTION AND EXPLANATION OF FIG. 9

FIG. 9 is a block diagram of the preferred means of generating and manipulating the patterns generated by the control unit and viewed on the screen of the video monitor.

Referring to FIG. 9, the line and frame sync pulses are separated from the CCTV camera output (24) via the sync stripper (40) and are then separated from each other via the sync separator (41). The line sync pulses (42) are used to start and synchronize a ramp generator (44), and the frame sync pulses (43) are used to reset and start and integrator (45) every frame. The offset control (190) is the initial condition input (53) ($V_{offset}$) to the integrator, and the angular orientation control (180) is the input ($V_{in}$) which is integrated. Thus the output, $V_{out}$ of the integrator (46) as a function of time is $$V_{out} = V_{offset} + \int_0^t V_{in} dt'.$$

The sequence of dots on a line, or lines on a frame, is generated as follows. The ramp generator (44) starts at the beginning of a line. When the output (130) of the ramp generator (44) is larger than the output of the integrator (46) the comparator (47) switches state and starts a gated oscillator (48). For every cycle of the oscillator a one-shot (49) is triggered. The output (50) of the one-shot (49) is then summed with the video signal (24) in the video summing amplifier (51). This causes the video signal (250) to be blanked (or enhanced if one wishes) at every point in time where the one-shot is triggered. Thus a series of dots on a line, or lines on a frame, is generated on the video monitor (21). If at the input to the integrator $V_{in} = 0$, then $V_{out} = V_{offset}$ and the dots will be in the same position on each line, and the pattern formed will be a family of equally spaced vertical lines. The offset D of the lines is controlled by the offset control (190) which controls the $V_{offset}$ input (53) to the integrator (45). If $V_{offset}$ (53) is increased it will take longer for the ramp generator (44) to reach the value and the series of dots (or lines) will be moved to the right. Lowering $V_{offset}$ has the opposite effect. If now the $V_{in}$ or angular orientation φ input (54) is made different from zero, the output (46) of the integrator (45) will be linearly modulated up or down from $V_{offset}$ depending on the polarity of $V_{in}$ in phase with each frame generation. This causes the series of dots to start at a different time each line. Thus the video monitor (21) will show a family of tilted lines with an angular orientation φ.

The spacing d of the lines is controlled by the line spacing control (170) which changes the frequency of the gated oscillator (48). A higher frequency causing more dots on each line.

The output of the comparator (47) is fed into AND gates (110) and (111) which are controlled by flip-flop (112). Flip-flop (112) is reset every frame by the frame sync pulses, and clocked every line by the line sync pulses. The effect of this is to turn on gate (110) every even numbered line and gate (111) every odd numbered line. Therefore variable delay (113) will control the start of a family of lines on the even numbered lines, and variable delay (114) will control the start of a family of lines on the odd numbered lines. The outputs of (113) and (114) are OR'd together by OR gate (115). Since each measurement pattern goes on every other line they appear as dotted lines on the screen. To differentiate between the two measurement patterns, the output (131) of flip-flop (112) is used to select black or white dotted lines. Thus one measurement pattern is white dotted lines, and the other measurement pattern is black dotted lines. By changing the variable delays (113) and (114), the two measurement patterns can be moved relative to each other to line up with the test pattern.

Figure 10:
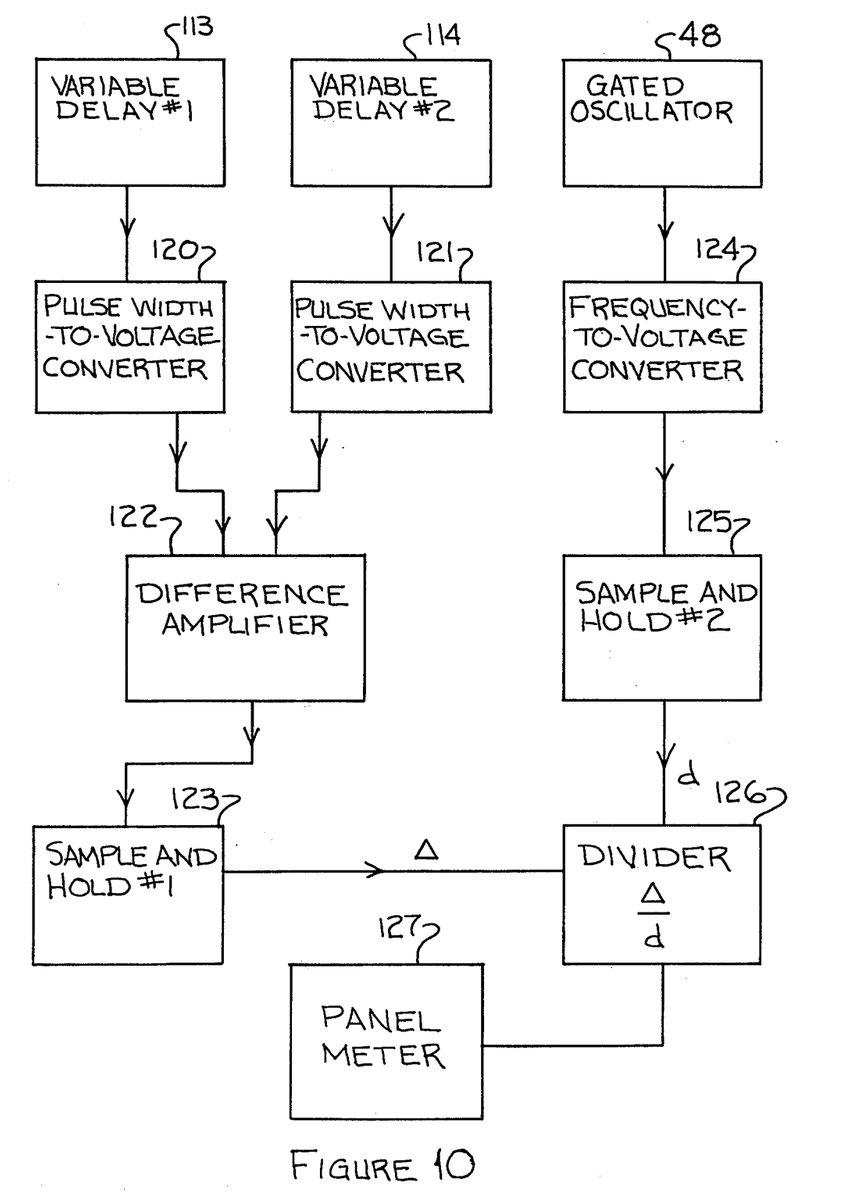
FIG. 10 is a block diagram of the preferred means of quantitatively reducing an interference pattern with two patterns generated by the control unit.

DESCRIPTION AND EXPLANATION OF FIG. 10

FIG. 10 is a block diagram of the preferred means of quantitatively reducing an interference pattern with two patterns generated by the control unit. To quantify Δ/d the circuit as shown in FIG. 10 can be implemented. The outputs of variable delays (113) and (114) are fed into pulse width-to-voltage converters (120) and (121). The magnitude of the difference between the outputs of (120) and (121) is generated by amplifier (122) whose output is sampled-and-held by (123). The output of the sample-and-hold (123) is then the value of Δ. d is generated by feeding the output of the gated oscillator (48) into a frequency-to-voltage converter (124) whose output is sampled-and-held by (125). The output of sample-and-hold (125) is then the value d. Δ and d are then fed into divider (126) to generate Δ/d. Δ/d is then fed into a panel meter (127) to display the Δ/d reading.

In addition to the obvious utility of the apparatus and method herein disclosed, another advantage of the present invention is that it allows simultaneous recording of the test and measuring patterns, e.g., one can photograph the image displayed on the monitor, for a permanent record.

It should be obvious to one skilled in the art of electronics that the specific apparatus described in this specification can be altered to generate measurement patterns more complex than those discussed above, for example, patterns with curved lines and non-uniform spacing to match test patterns such as represent classical aberrations, e.g. coma, spherical aberration, and astimatism. By manipulating such measurement patterns relative to the appropriate test patterns, quantification of the irregularities of the test patterns can be obtained. Other variations can also be made, without departing from the invention, which is described in the claims.

What we claim is:

1. An apparatus for quantifying the irregularities in a geometric test pattern consisting essentially of lines, such as an interference fringe pattern produced by an interferometer, comprising (1) a television monitor including a viewing screen, (2) means for displaying said test pattern on said viewing screen, (3) means for generating a measuring pattern consisting of regular lines conforming approximately to said test pattern, and for displaying said measuring pattern on said viewing screen simultaneously with said test pattern, (4) means for moving said measuring pattern and said test pattern relative to each other so that the individual lines of said measuring pattern can be placed in a first position in which all the lines of said measuring pattern lie to one side of the corresponding lines of the test pattern except for at least one portion of one line which coincides with the corresponding portion of said test pattern, (5) means for providing a similar measuring pattern placed in a second similar position on the other side of said test pattern, and (6) means for measuring the distance between said first position and said second position, and for comparing said distance with the average distance between the lines of the measuring pattern, to quantify the peak-to-valley irregularity of said test pattern.

2. The apparatus of claim 1, in which said means (5) for providing a similar measuring pattern comprises means for storing information about said first position of said measuring pattern, and means for moving said measuring pattern to said second similar position.

3. The apparatus of claim 1, in which said means (5) for providing a similar measuring pattern comprises means for generating a second measuring pattern geometrically identical to said measuring pattern, and for placing it in the desired position.

4. The apparatus of claim 3, in which one measuring pattern is white and the other measuring pattern is black.

5. The apparatus of claim 1, in which said means for generating a measuring pattern include individual controls which provide for (a) the spacing between the lines, (b) the tilt of the lines, and (c) the offset of the pattern from the edge of said viewing screen.

6. The method of quantifying the irregularities in an interference test pattern consisting of a series of spaced fringe lines which comprises (a) displaying said test pattern on the screen of a television monitor, (b) generating and displaying on said screen a measuring pattern consisting of regular lines conforming approximately to said test pattern, (c) positioning said measuring pattern into a first position in which it lies entirely to one side of said test pattern except where it coincides with the center of a corresponding portion of a fringe line of said test pattern, (d) placing a similar measuring pattern in a similar position on the other side of said test pattern, and (e) comparing the distance between said two positions with the average distance between the lines of the measuring pattern(s), thus quantifying the peak-to-valley irregularity in said test pattern.

7. The method of claim 6, in which a single measuring pattern is used, and it is moved from one position to the other.

8. The method of claim 6, in which two geometrically identical measuring patterns of opposite color are generated and displayed and positioned on opposite sides of the test pattern.

* * * * *